US010468984B2

(12) United States Patent
Gallina et al.

(10) Patent No.: US 10,468,984 B2
(45) Date of Patent: Nov. 5, 2019

(54) DC-DC SWITCHING CONVERTER WITH ADAPTIVE VOLTAGE POSITIONING COMBINED WITH DIGITAL-TO-ANALOG CONVERTER SERVO

(71) Applicant: Dialog Semiconductor (UK) Limited, London (GB)

(72) Inventors: Pietro Gallina, Swindon (GB); Vincenzo Bisogno, Swindon (GB); Mark Childs, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/200,483

(22) Filed: Jul. 1, 2016

(65) Prior Publication Data
US 2018/0006558 A1 Jan. 4, 2018

(51) Int. Cl.
  *H02M 3/158* (2006.01)
  *H02M 3/156* (2006.01)
  (Continued)

(52) U.S. Cl.
  CPC .......... *H02M 3/158* (2013.01); *H02M 3/156* (2013.01); *H02M 3/157* (2013.01); *H02M 2001/0025* (2013.01)

(58) Field of Classification Search
  CPC ......... H02M 2001/0025; H02M 3/156; H02M 3/157; H02M 3/158; H02M 2003/1566
  See application file for complete search history.

(56) References Cited

U.S. PATENT DOCUMENTS 4,276,591 A 6/1981 Quick
6,465,993 B1 * 10/2002 Clarkin ................. H02M 3/156
                                                          323/272

(Continued)

FOREIGN PATENT DOCUMENTS

DE    10 2015 225 829    3/2017

OTHER PUBLICATIONS

German Search Report, File No. 10 2016 219 186.1, Applicant: Dialog Semiconductor (UK) Ltd, dated Apr. 26, 2017, 6 pgs, and English language translation, 7 pgs.

(Continued)

*Primary Examiner* — Yusef A Ahmed
*Assistant Examiner* — Ishrat F Jamali
(74) *Attorney, Agent, or Firm* — Saile Ackerman LLC; Stephen B. Ackerman

(57) ABSTRACT

An object of this disclosure is to implement a Buck, Boost, or other switching converter, with a circuit to supply a reference voltage and Adaptive Voltage Positioning (AVP), by a servo and programmable load regulation. The reference voltage is modified, achieving a high DC gain, using a servo to remove any DC offset at the output of the switching converter. The correction implemented by the servo is measured, and a programmable fraction of the correction is injected back on either the reference voltage or the output feedback voltage. To accomplish at least one of these objects, a Buck, Boost, or other switching converter is implemented, consisting of an output stage driven by switching logic, with a servo configured between the reference voltage and the control loops of the Buck converter. The AVP function is implemented on either the reference voltage or output feedback voltage.

4 Claims, 11 Drawing Sheets

(51) Int. Cl.
*H02M 3/157* (2006.01)
*H02M 1/00* (2006.01)

(56) References Cited

U.S. PATENT DOCUMENTS

| | | | |
|---|---|---|---|
| 7,652,604 B2 | 1/2010 | Parayandeh et al. | |
| 7,656,140 B2* | 2/2010 | Marino | H02M 3/157 323/282 |
| 8,674,674 B1 | 3/2014 | Qahouq | |
| 2003/0102849 A1* | 6/2003 | Schiff | H02M 3/1584 323/222 |
| 2006/0043947 A1* | 3/2006 | Clavette | H02M 3/158 323/282 |
| 2007/0257647 A1 | 11/2007 | Chen et al. | |
| 2008/0024100 A1* | 1/2008 | Huang | H02M 3/158 323/282 |
| 2011/0119513 A1* | 5/2011 | Krishnamurthy | G06F 1/26 713/340 |
| 2012/0306278 A1 | 12/2012 | Fajtl | |
| 2014/0320093 A1* | 10/2014 | Zhao | H02M 3/156 323/234 |
| 2016/0141956 A1* | 5/2016 | Dong | H02M 3/157 323/271 |
| 2017/0070146 A1 | 3/2017 | Childs et al. | |

OTHER PUBLICATIONS

"Dithering Skip Modulation, Width and Dead Time Controller in Highly Efficient DC-DC Converters for System-On-Chip Applications," by Hong-Wei Huang et al., IEEE Journal of Solid-State Circuits, vol. 42, No. 11, Nov. 2007, pp. 2451-2465.
Co-pending U.S. Appl. No. 14/845,406, dated Sep. 4, 2015, "DAC Servo," by Mark Childs et al., 21 pgs.
"Adaptive Voltage Position Design for Voltage Regulators," by Kaiwei Yao et al., APEC '04. Nineteenth Annual IEEE, Applied Power Electronics Conference and Exposition, Jan. 2004, pp. 272-278, vol. 1.

* cited by examiner

DC-DC SWITCHING CONVERTER WITH ADAPTIVE VOLTAGE POSITIONING COMBINED WITH DIGITAL-TO-ANALOG CONVERTER SERVO

RELATED PATENT APPLICATIONS

This application is related to U.S. patent application Ser. No. 14/845,406, filed on Sep. 4, 2015, assigned to the same assignee as the present disclosure, and incorporated herein by reference in its entirety.

BACKGROUND

Field

The disclosure relates generally to Buck, Boost, and other types of DC-DC switching power converters, achieving load regulation in the switching converters.

Description of Related Art

Because DC-DC switching converters usually need to provide a specified DC output voltage that remains within the voltage requirements of the circuits to which they are providing the voltage, they are typically designed to provide a voltage that remains within a specified voltage range over an anticipated range of load conditions. For example, a rapid increase in current drawn often causes a temporary undesired reduction in the output voltage of a switching converter. The switching converter must be designed to maintain an adequate output voltage for a specified maximum increase in current drawn. Similarly, a rapid decrease in current drawn can result in a temporary undesired increase in output voltage, which may be similarly characterized to ensure that the voltage increase does not exceed the voltage range required by the load.

One solution to the problem of regulating the output voltage in changing current conditions is to utilize Adaptive Voltage Positioning (AVP), which provides an intentionally varying output voltage for different current loads, such that the output voltage is a relatively low potential under a high current load and a relatively high potential under a no current load. A change in current load will then cause the output voltage to temporarily change in a direction that is compensated for by the variable output voltage.

Load regulation involves the ability of a system, such as a switching converter, to provide near constant voltage over a wide range of load conditions. The term may refer to a passive property that results in more or less voltage drop under various load conditions, or to the active intervention with devices for the specific purpose of adjusting the voltage.

FIG. 1 is a timing diagram illustrating the output voltage of a Prior Art DC-DC switching converter with a finite load regulation 120 compared with a DC-DC switching converter with no load regulation 110. The advantage of having load regulation is shown in 130, where the variation on the output voltage of the switching converter is significantly less than what it is with no regulation.

SUMMARY

An object of this disclosure is to implement a Buck, Boost, or other switching converter with a circuit to supply a reference voltage, and Adaptive Voltage Positioning (AVP), by means of a servo block feedback mechanism, to achieve high gain, and a certain programmable load regulation. The reference voltage is modified, achieving a high DC gain, by using a servo to remove any DC offset at the output of the switching converter. The correction implemented by the servo is measured, and a programmable fraction of the correction is injected back on either the reference voltage or the output feedback voltage.

Further, another object of this disclosure is to provide a programmable DC load regulation equal to the correction implemented by the servo multiplied by a programmable factor.

Still further, another object of this disclosure is for the servo itself to implement the AVP scheme, where no sensing or filtering of the output current is required.

Still further, another object of this disclosure is for the servo to implement the AVP scheme, without affecting the modes of operation of the switching converter.

To accomplish the above and other objects, a switching converter is disclosed, having a circuit configured to supply a reference voltage to the switching converter. A servo block feedback mechanism has as inputs an output feedback voltage and the reference voltage. An Adaptive Voltage Positioning (AVP) block is connected at either of the inputs of the servo block, and receives feedback from the servo block. Control loops are connected to an output of the servo block, and the output feedback voltage. There is switching logic at the outputs of the control loops. An output stage, driven by the switching logic, is configured to supply the output voltage of the switching converter.

The above and other objects are further achieved by a method for regulating a switching converter output voltage. The steps include implementing a circuit to supply a reference voltage to the switching converter. A servo block feedback mechanism is implemented having as inputs an output feedback voltage and the reference voltage. An Adaptive Voltage Positioning (AVP) block is implemented at either of the inputs of the servo block, receiving feedback from the servo block. The correction of the servo block is measured and injected as a programmable fraction back on either the output feedback voltage or the reference voltage, providing a correction defined by the native load regulation of the switching converter.

In various embodiments, the AVP function may be achieved using a Proportional Integral Loop (PID) with a programmable factor for the desired load regulation.

DETAILED DESCRIPTION

AVP in a DC-DC Buck, Boost, or other switching converter may be achieved when a certain load regulation maintains a constant voltage (or current) level on the output of a power supply despite changes in the supply's load. In addition, AVP gives the advantage in terms of output capacitance required for a given tolerance band when including the effect of transient loads.

Figure 1:
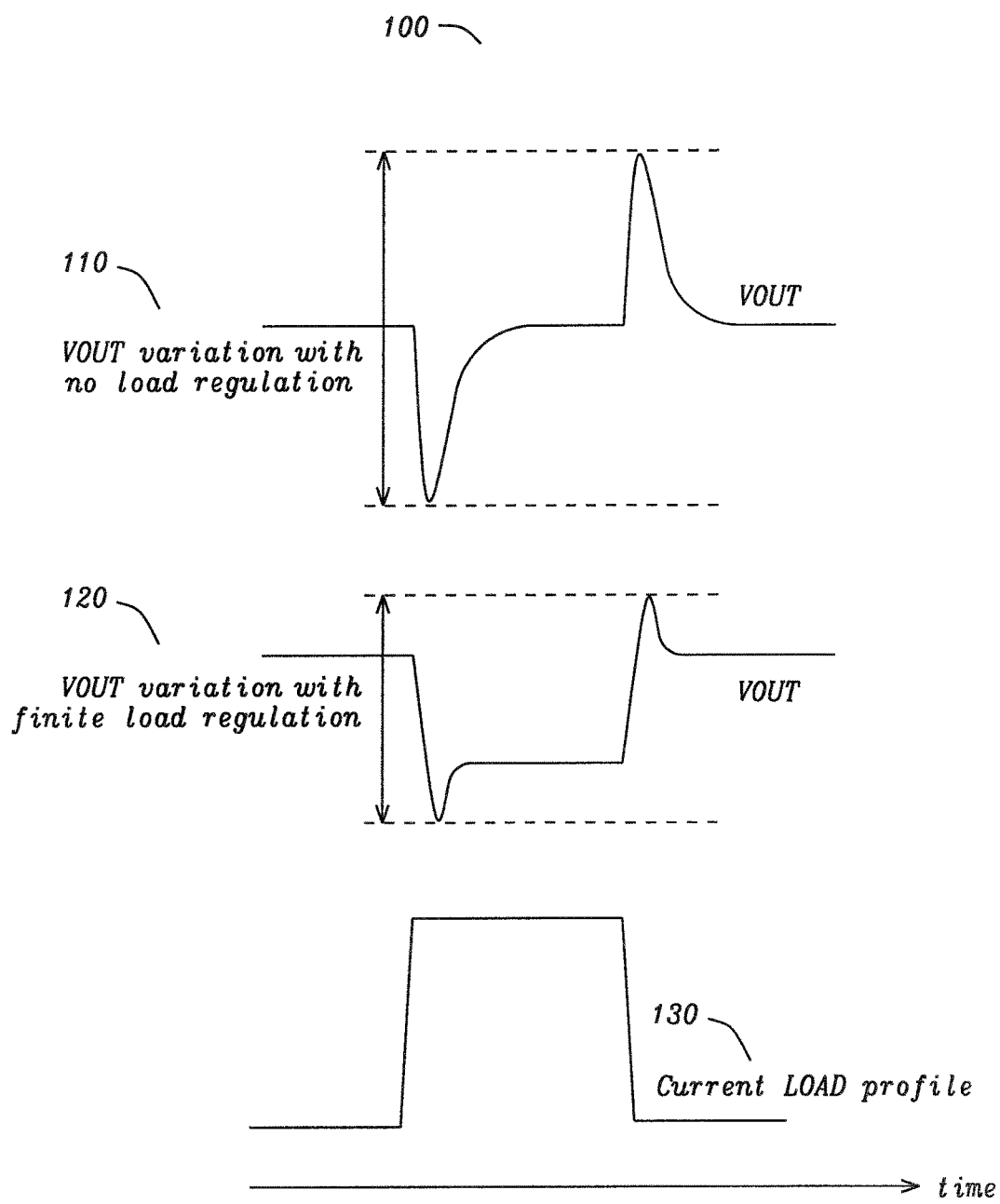
FIG. 1 is a timing diagram illustrating the output voltage of a Prior Art DC-DC switching converter with a finite load regulation compared with a DC-DC switching converter with no load regulation.
Figure 2:
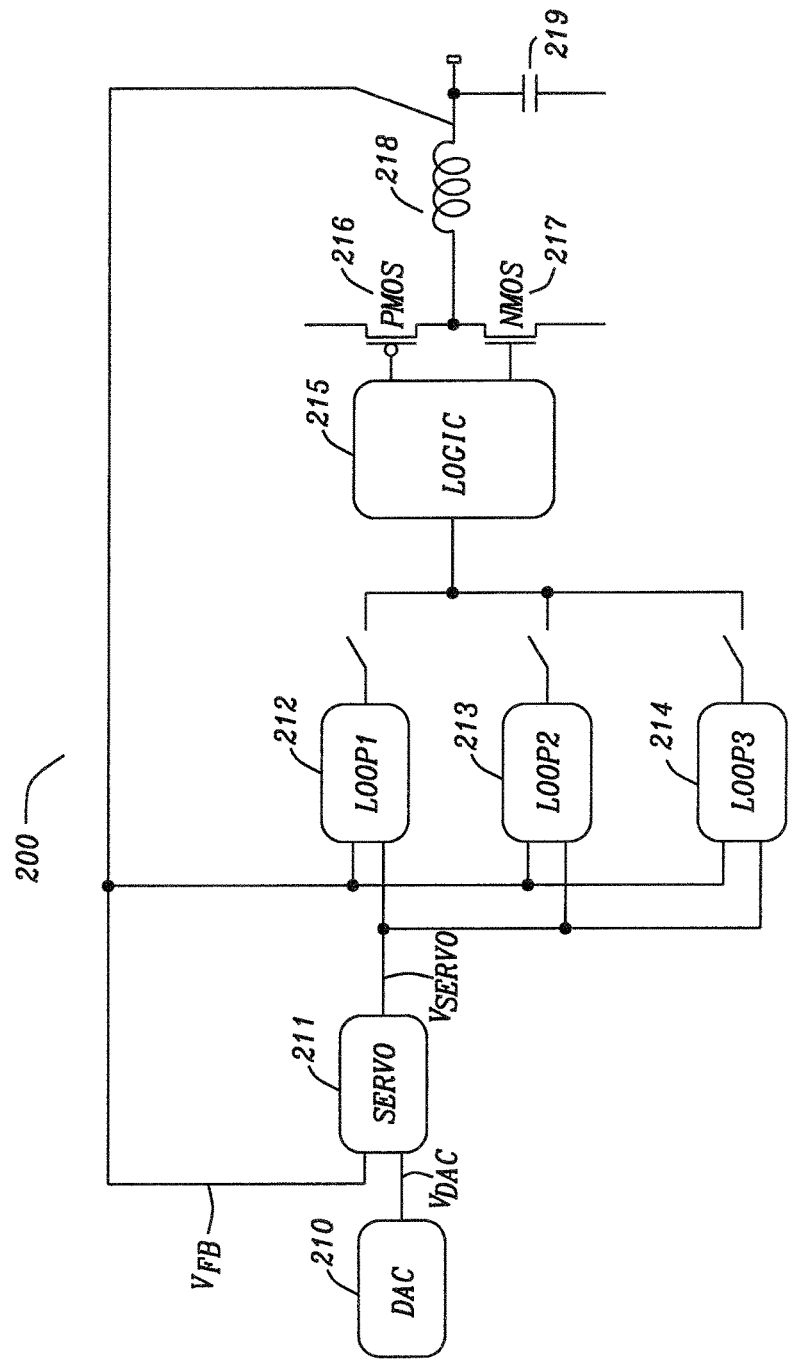
FIG. 2 is a block diagram illustrating an exemplary switching converter which compares an output voltage with a DAC reference voltage to make a control loop with negative feedback, and a servo loop, a feedback mechanism to achieve high gain and ideal load regulation, capable of correcting the feedback voltage for high DC gain.

FIG. 2 is a block diagram illustrating an exemplary switching converter which compares an output voltage with a DAC reference voltage to make a control loop with negative feedback, and a servo loop, a feedback mechanism to achieve high gain and ideal load regulation, capable of correcting the feedback voltage for high DC gain, as disclosed in related patent application Ser. No. 14/845,406. The output stage consists of PMOS transistor 216, NMOS transistor 217, coil 218 and capacitor 219. Switching LOGIC 215 takes control data from one of several control loops. In the diagram, LOOP1, LOOP2, and LOOP3 indicate sync mode (PWM) 212, sleep mode (PFM) 213, and dynamic sleep mode (continuous conduction mode PFM) 214 respectively. Each control loop takes feedback voltage VFB, the output voltage of the switching converter, and the output of servo 211, as inputs. Inputs to servo 211 are feedback voltage VFB, and DAC reference voltage VDAC, the target output voltage of the converter. The servo loop is slow in comparison to the control loops, and is needed to achieve the high DC gain.

DAC reference voltage VDAC is modified using the servo block to remove any DC offset at the output of the switching converter. This scheme is beneficial for the following reasons. It is easier to implement the slow loop integrator separately without affecting the existing loops, and its modular design makes it useful to control all loops with one design.

The servo block compares the feedback voltage VFB, with the DAC voltage VDAC, one of several ways to provide a reference voltage. If the output voltage of the switching converter is lower than the reference voltage, the modified DAC voltage is passed to the control loops. The output of the servo block, VSERVO, is then slowly increased to remove the error.

Figure 3:
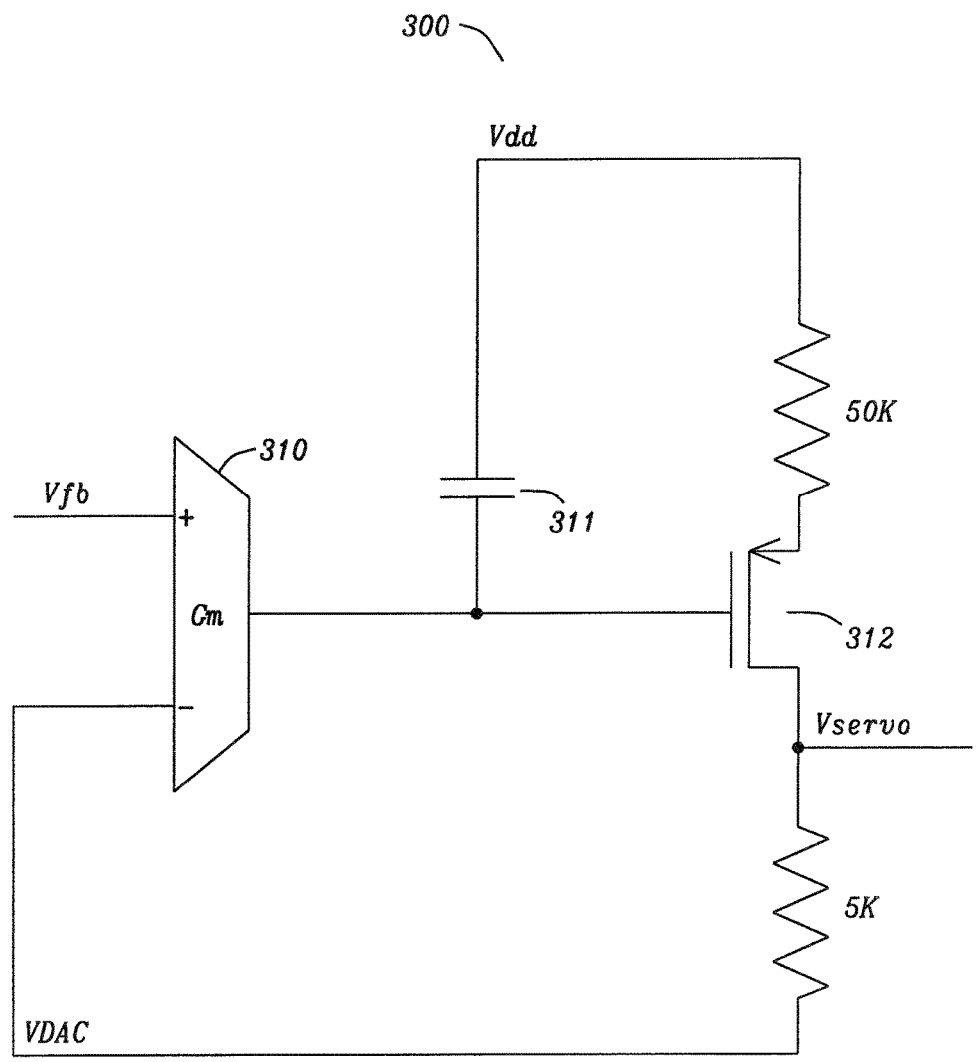
FIG. 3 is a circuit diagram illustrating the preferred implementation of the servo loop described in FIG. 2.

FIG. 3 is a circuit diagram illustrating a preferred implementation of the servo loop described in FIG. 2. In the design, servo block 300 consists of a first transconductance (GM) stage 310, with non-inverting input connected to feedback voltage VFB and inverting input connected to DAC voltage VDAC. The first GM stage 310 drives the output current to capacitor 311. The output voltage of first GM stage 310 controls a second GM stage, implemented using PMOS transistor 312 in saturation. The output current from PMOS transistor 312 flows through a 5K resistor connected to the DAC voltage. The voltage across this resistor is added to VDAC to give a controlled offset to output servo voltage VSERVO. The smaller the voltage across capacitor 311, the greater the current in PMOS transistor 312 and the greater the offset to DAC voltage VDAC in VSERVO. A 50K resistor connects supply voltage VDD to the source of PMOS transistor 312. The servo block in FIG. 3 is described in further detail in related patent application Ser. No. 14/845,406.

To implement the Adaptive Voltage Positioning (AVP) combined with the Digital-to-Analog Converter (DAC), one of several ways to provide a reference voltage, the proposed solution aims to integrate the two functions, of achieving a high DC gain and adjusting the target reference voltage, so that no sensing and filtering of output current is required. The proposed solution for the AVP function uses only the information provided by the servo loop itself, and modifies the DAC reference voltage or the feedback voltage accordingly. The output voltage dependency on the load is improved. Ideally, for infinite gain, any dependence of the output voltage on the output current is removed, and a near constant voltage over a wide range of load conditions is achieved.

Figure 4:
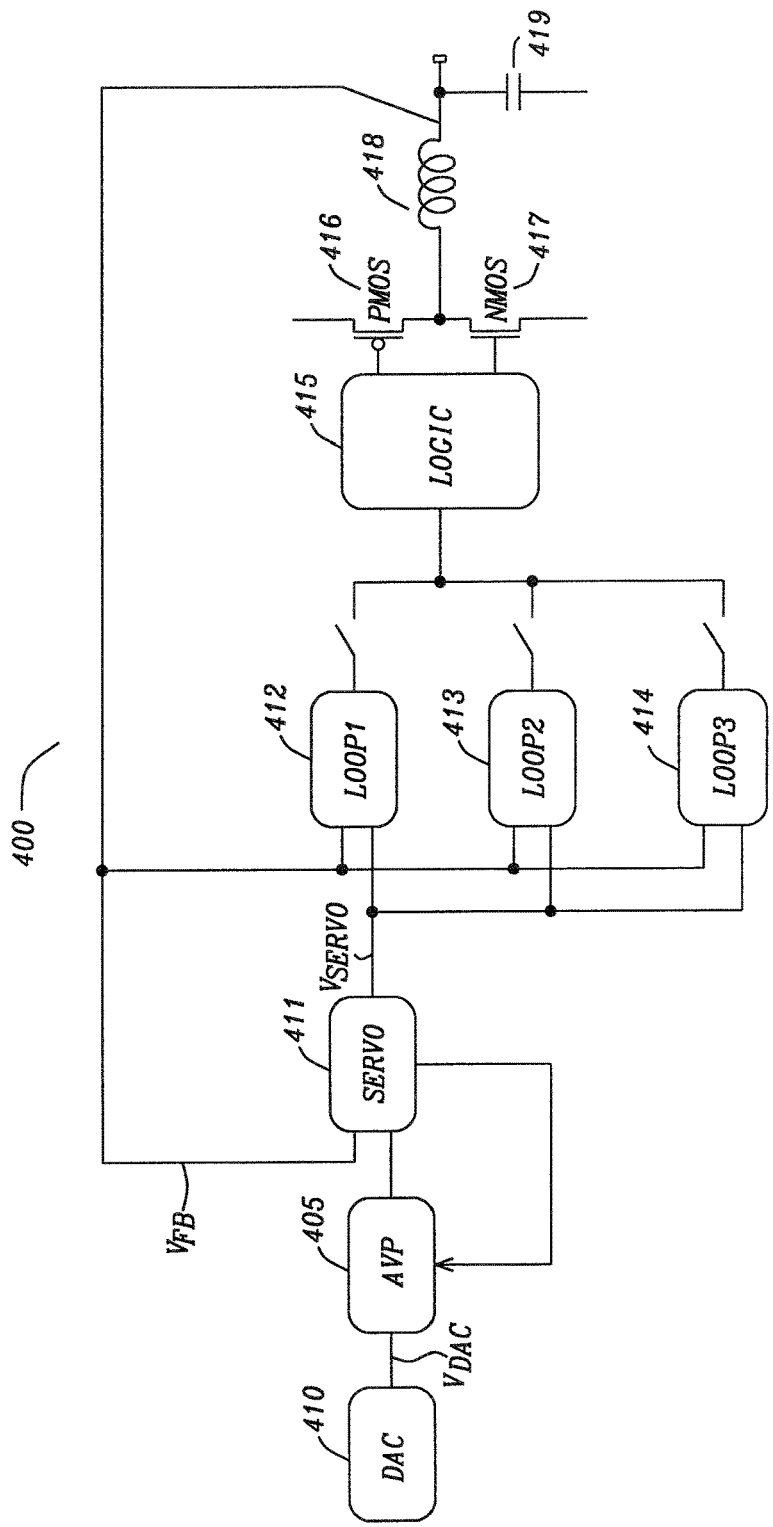
FIG. 4 is a block diagram illustrating the correction implemented by the servo loop injected back on a DAC reference voltage, one of several ways to provide a reference voltage, to achieve a programmable load regulation, embodying the principles of the disclosure.

FIG. 4 is a block diagram illustrating the correction implemented by the servo loop injected as a programmable fraction back on the DAC reference voltage, one of several ways to provide a reference voltage, to achieve a programmable load regulation, embodying the principles of the disclosure. The output stage consists of PMOS transistor 416, NMOS transistor 417, coil 418 and capacitor 419. Switching LOGIC 415 takes control data from one of several control loops. In FIG. 4, LOOP1, LOOP2, and LOOP3 indicate sync mode (PWM) 412, sleep mode (PFM) 413, and dynamic sleep mode (continuous conduction mode PFM) 414, respectively. Each control loop takes feedback voltage VFB, the output of the switching converter, and output of servo loop 411 VSERVO, as inputs. Inputs to servo 411 are feedback voltage VFB, and DAC reference voltage VDAC 410, adjusted by AVP block 405. Inputs to AVP block 405 are DAC reference voltage VDAC 410 and the correction implemented by the servo loop injected as a programmable fraction back on the DAC reference voltage.

By measuring the correction implemented by the servo loop, and injecting a programmable fraction of this back on the reference voltage, by means of the AVP block, it is possible to achieve a programmable DC load regulation. The load regulation becomes the correction of the servo loop multiplied by a programmable factor. The correction is defined by the native load regulation of the Buck, Boost, or other switching converter, and for a given design is a known value. The servo loop implements the AVP scheme, without affecting the various modes of operation of the switching converter illustrated by LOOP1, LOOP2, and LOOP3.

Figure 5:
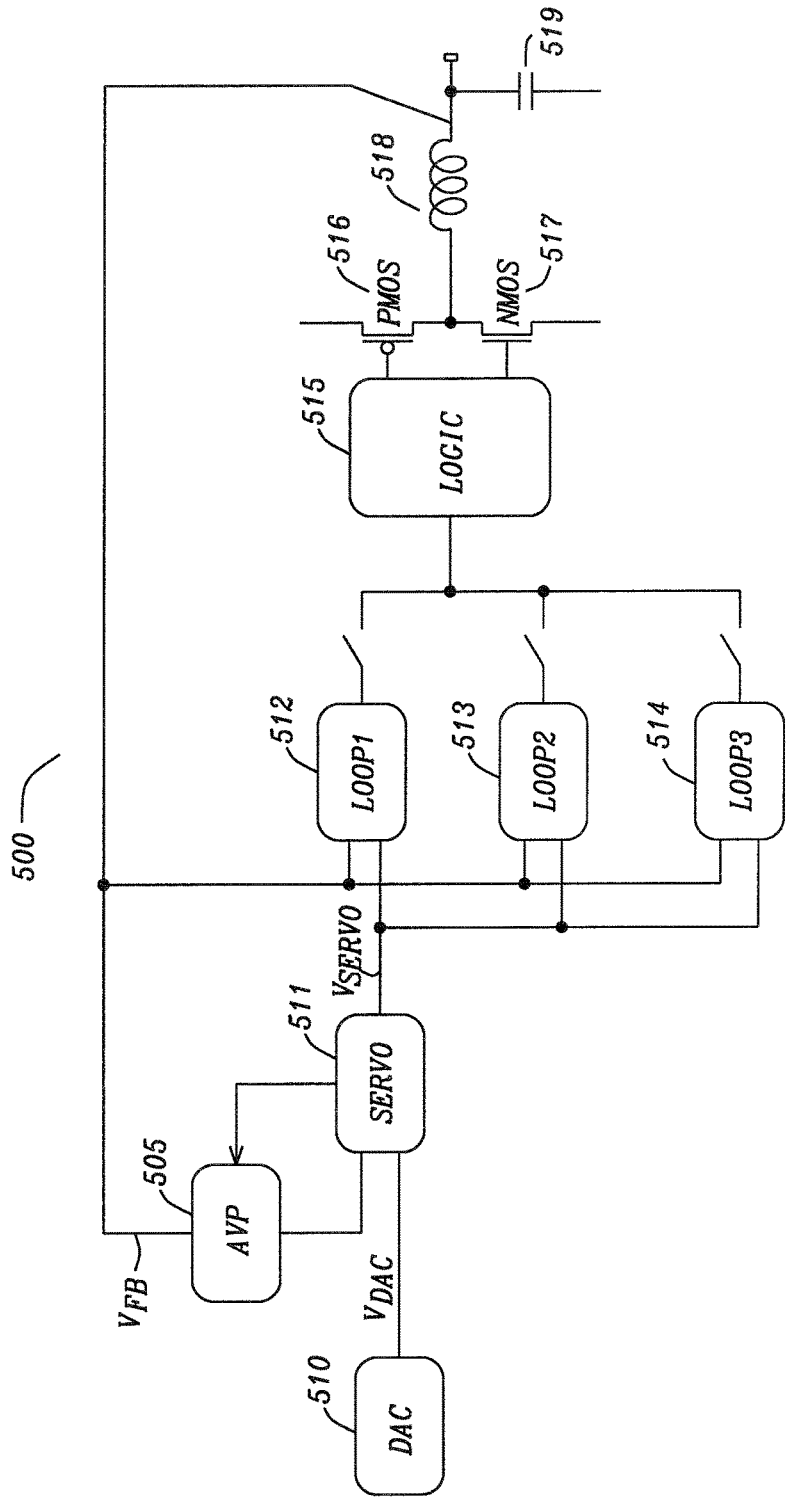
FIG. 5 is a block diagram illustrating the correction implemented by the servo loop injected back on the feedback voltage, the output of the switching converter, to achieve a programmable load regulation, embodying the principles of the disclosure.

FIG. 5 is a block diagram illustrating the correction implemented by the servo loop injected as a programmable fraction back on the feedback voltage, the output of the switching converter, to achieve a programmable load regulation, embodying the principles of the disclosure. The output stage consists of PMOS transistor 516, NMOS transistor 517, coil 518 and capacitor 519. Switching LOGIC 515 takes control data from one of several control loops. In FIG. 5, LOOP1, LOOP2, and LOOP3 indicate sync mode (PWM) 512, sleep mode (PFM) 513, and dynamic sleep mode (continuous conduction mode PFM) 514, respectively. Each control loop takes feedback voltage VFB, and output of servo loop 511 VSERVO, as inputs. Inputs to servo 511 are the feedback voltage adjusted by AVP block 505, and DAC reference voltage 510 VDAC, the target output voltage for the switching converter. Inputs to AVP block 505 are feedback voltage VFB, the output of the switching converter, and the correction implemented by the servo loop injected as a programmable fraction back on the feedback voltage.

By measuring the correction implemented by the servo loop and injecting a programmable fraction of this back on the feedback voltage, by means of the AVP block, it is possible to achieve a programmable DC load regulation. The load regulation becomes the correction provided by the servo loop multiplied by a programmable factor. The correction is defined by the native load regulation of the Buck, Boost, or other switching converter, and for a given design is a known value. The servo loop implements the AVP scheme, without affecting the various modes of operation of the switching converter illustrated by LOOP1, LOOP2, and LOOP3.

The reason the switching converter cannot be designed with the desired load regulation derives from stability constraints, since the main loop gain that defines this parameter is crucial in defining the phase margin of the switching converter. The servo loop and the adaptive voltage positioning scheme of the proposed solution work together as a slow loop integrator, which does not affect the main loop modes of operation, and may be adjusted to a desired level without affecting the system stability.

Figure 6A:
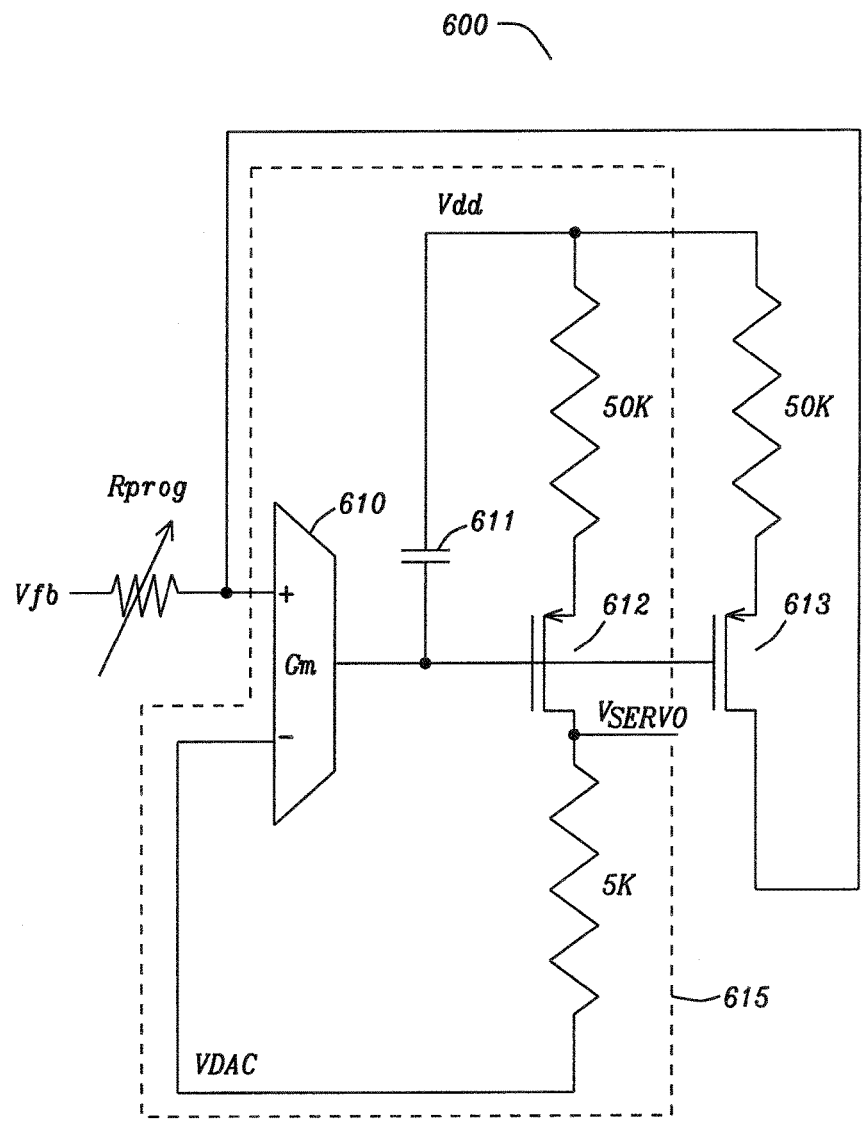
FIG. 6a is a circuit diagram illustrating a way of measuring and summing a programmable contribution back on the feedback voltage, the output voltage of the switching converter, embodying the principles of the disclosure.

FIG. 6a is a circuit diagram illustrating a way of measuring and summing a programmable contribution back on the feedback voltage, the output voltage of the switching converter, embodying the principles of the disclosure. In the design, a block 600 for a servo 615 plus AVP consists of a first transconductance (GM) stage 610, with non-inverting input connected to feedback voltage VFB, across programmable resistor Rprog, and inverting input connected to DAC reference voltage VDAC. The first GM stage 610 drives output current to capacitor 611. The output voltage of first GM stage 610 controls a second GM stage, implemented with PMOS transistor 612 in saturation. The drain current of PMOS transistor 612 flows through a 5K resistor connected to VDAC, the inverting input of first GM stage 610. The voltage across the 5K resistor is added to the DAC voltage, to give a controlled offset to servo output voltage VSERVO. The smaller the voltage across capacitor 611, the greater the current in PMOS transistor 612 and the greater the offset to VDAC. A 50K resistor connects supply voltage VDD to the source of PMOS transistor 612. A second 50K resistor connects supply voltage VDD to the source of PMOS transistor 613, whose drain is also connected to the non-inverting input of first GM stage 610.

By measuring the correction determined by the servo loop, a fraction may be injected back onto the feedback voltage, at the inverting input of the first GM stage. A programmable DC load regulation is achieved with minimum overhead, for the specifics of the environment of the circuit in FIG. 6a.

Figure 6B:
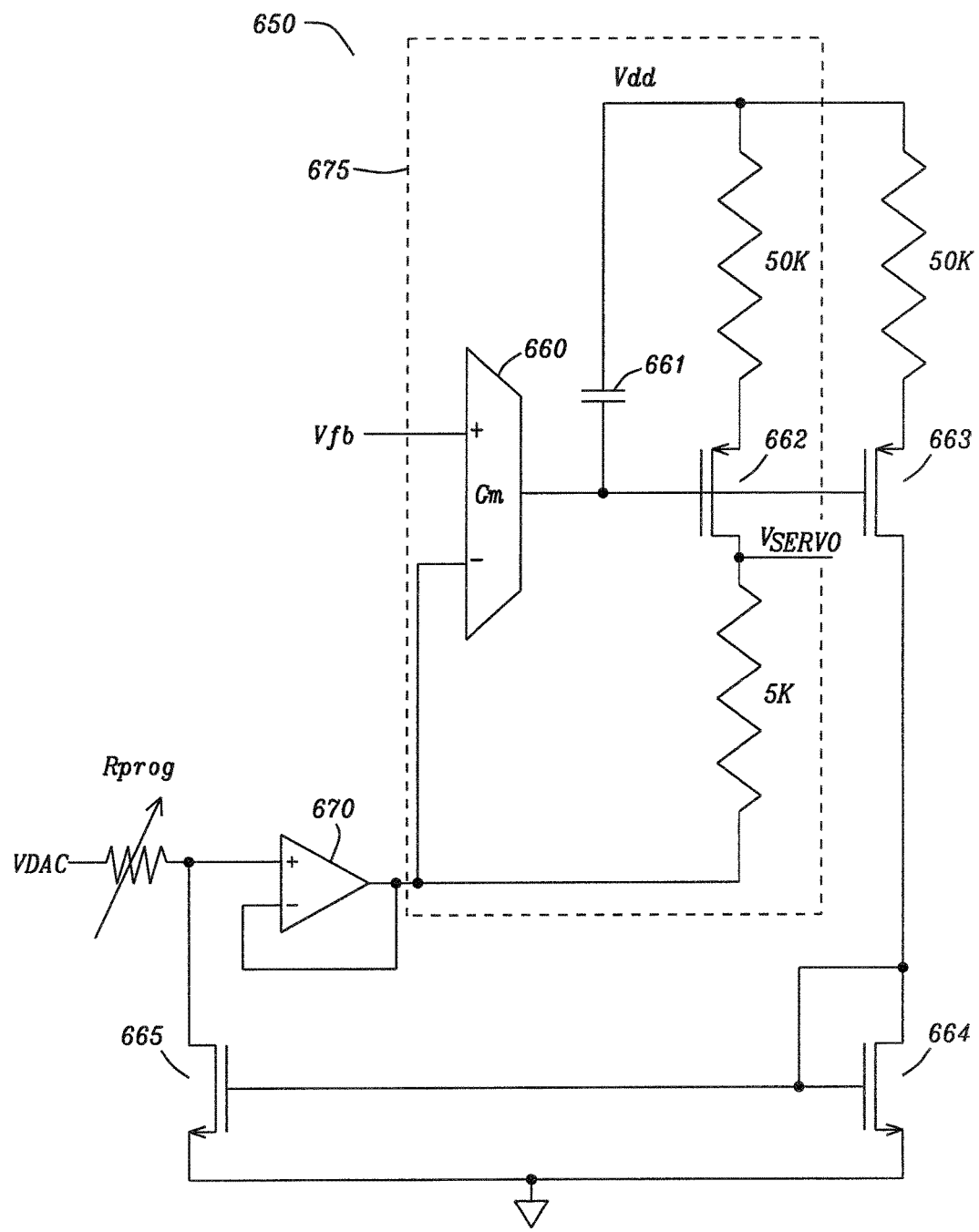
FIG. 6b is a circuit diagram illustrating a way of measuring and summing a programmable contribution back on the reference voltage, the target output voltage of the switching converter, embodying the principles of the disclosure.

FIG. 6b is a circuit diagram illustrating a way of measuring and summing a programmable contribution back on the reference voltage, the target output voltage of the switching converter, embodying the principles of the disclosure. In the design, a block 650 for a servo 675 plus AVP consists of a first transconductance (GM) stage 660, with non-inverting input connected to feedback voltage VFB, and inverting input connected to the output of op-amp 670. Op-amp 670 has its non-inverting input connected to reference voltage VDAC, across programmable resistor Rprog, and inverting input connected to its output. The first GM stage 660 drives output current to capacitor 661. The output voltage of first GM stage 660 controls a second GM stage, implemented with PMOS transistor 662 in saturation. The drain current of PMOS transistor 662 flows through a 5K resistor connected to the inverting input of first GM stage 660. The voltage across the 5K resistor is added to the output voltage of op-amp 670, to give a controlled offset to servo output voltage VSERVO. The smaller the voltage across capacitor 661, the greater the current in PMOS transistor 662 and the greater the offset to VDAC. A 50K resistor connects supply voltage VDD to the source of PMOS transistor 662. A second 50K resistor connects supply voltage VDD to the source of PMOS transistor 663, whose drain is connected to the drain and gate of NMOS transistor 664, and to the gate of NMOS transistor 665. The source of NMOS transistor 664 is also the source of NMOS transistor 665, and the drain of NMOS transistor 665 drives the non-inverting input of op-amp 670.

Figure 6C:
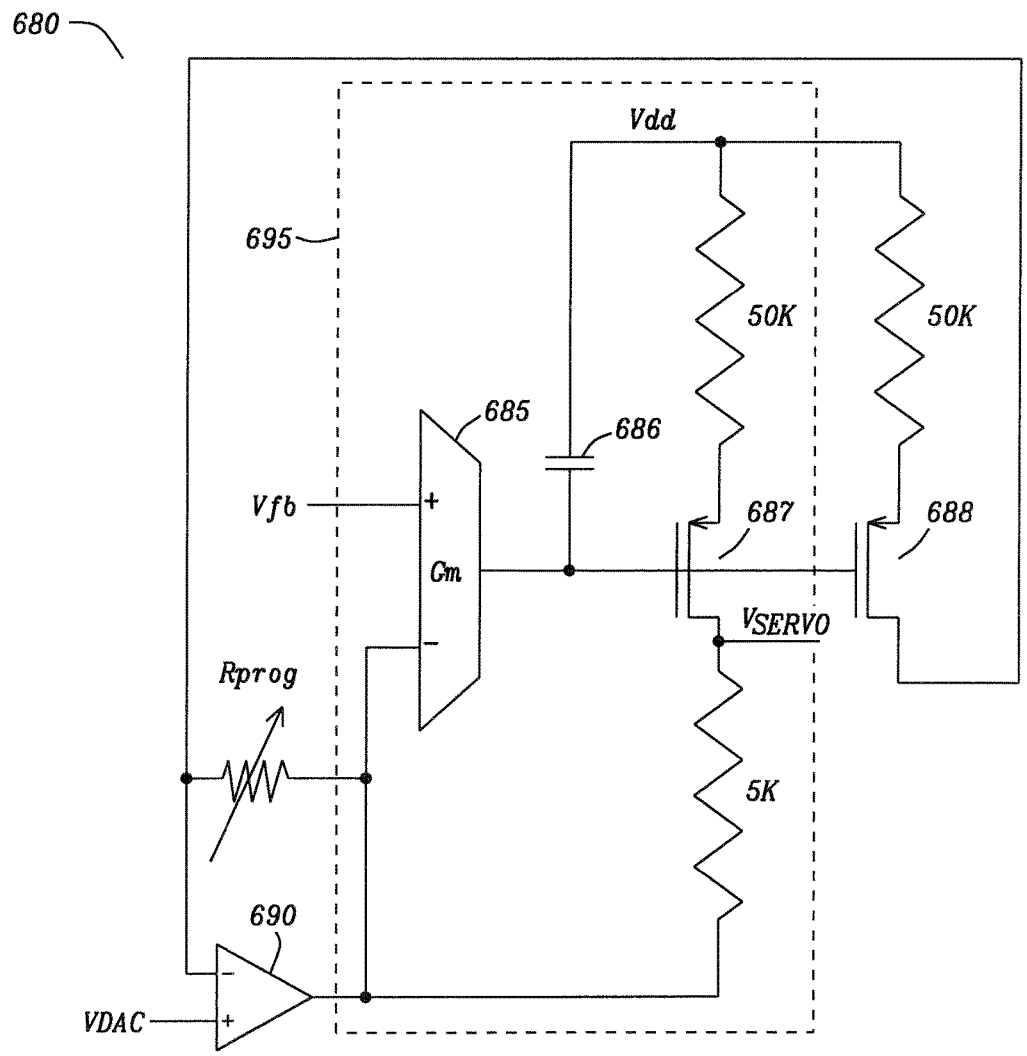
FIG. 6c is a circuit diagram illustrating a way of measuring and summing a programmable contribution back on the reference voltage, in an alternative solution, embodying the principles of the disclosure.

FIG. 6c is a circuit diagram illustrating a way of measuring and summing a programmable contribution back on the reference voltage, in an alternative solution, embodying the principles of the disclosure. In the design, a block 680 for a servo 695 plus AVP consists of a first transconductance (GM) stage 685, with non-inverting input connected to feedback voltage VFB, and inverting input connected to the output of op-amp 690. Op-amp 690 has its non-inverting input connected to reference voltage VDAC, and its inverting input connected to its output, across programmable resistor Rprog. The first GM stage 685 drives output current to capacitor 686. The output voltage of first GM stage 685 controls a second GM stage, implemented with PMOS transistor 687 in saturation. The drain current of PMOS transistor 687 flows through a 5K resistor connected to the inverting input of first GM stage 685. The voltage across the 5K resistor is added to the output voltage of op-amp 690, to give a controlled offset to servo output voltage VSERVO. The smaller the voltage across capacitor 686, the greater the current in PMOS transistor 687 and the greater the offset to VDAC. A 50K resistor connects supply voltage VDD to the source of PMOS transistor 687. A second 50K resistor connects supply voltage VDD to the source of PMOS transistor 688, whose drain is also connected to the inverting input of op-amp 690.

By measuring the correction determined by the servo loop, a fraction may be injected back onto the reference voltage, at the inverting input of op-amp 690 in FIG. 6c. A programmable DC load regulation is achieved with minimum overhead, for the specifics of the environment of the circuit in FIG. 6b, where a fraction may be injected back onto the reference voltage, at the non-inverting input of op-amp 670.

Figure 7:
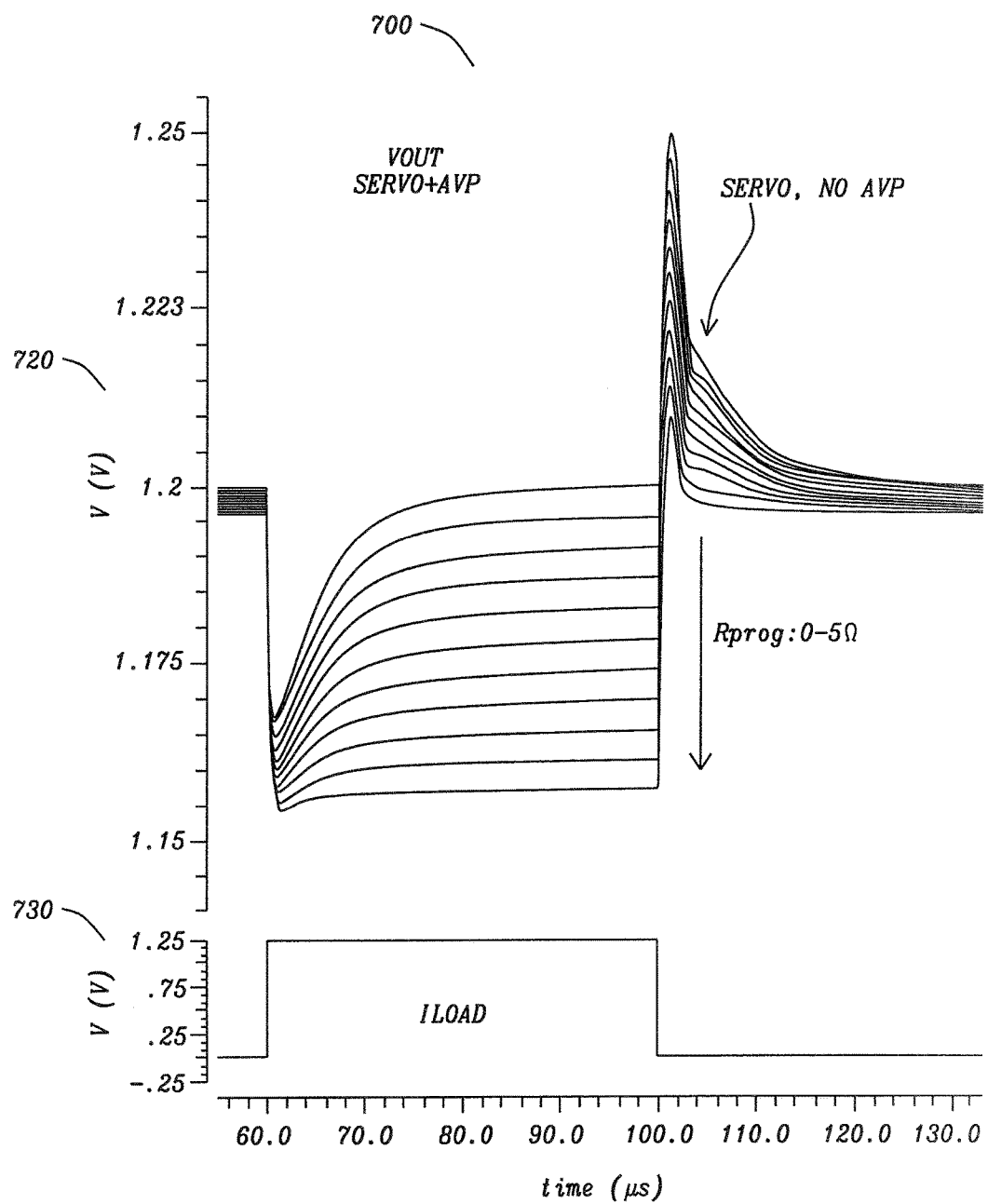
FIG. 7 is a timing diagram illustrating a load transient response of a DC-DC switching converter with a servo loop and an Adaptive Voltage Positioning (AVP), configured on the feedback voltage, the output voltage of the switching converter embodying the principles of the disclosure.

FIG. 7 is a timing diagram illustrating a load transient response of a DC-DC switching converter, with a servo loop and Adaptive Voltage Positioning (AVP) configured on the feedback voltage, the output voltage of the switching converter, embodying the principles of the disclosure. Programmable resistance Rprog is varied between 0KΩ, and 5KΩ, for the AVP function illustrated in FIG. 5 and FIG. 6a. The output voltage VOUT 720, and the load current ILOAD 730, of the switching converter is observed. The DC load regulation progressively increases as Rprog increases from 0KΩ, and 5KΩ, and the effect is to provide Adaptive Voltage Positioning.

A proportional-integral-derivative controller (PID) is a control loop feedback mechanism widely used in control systems, as is known in the art. A PID controller calculates an error value as the difference between a measured process variable, the feedback voltage and output of the switching converter, and a desired set point, the DAC reference voltage, one of several ways to provide a reference voltage. The PID controller attempts to minimize the error in the desired set point by adjusting the process variable, through the use of a manipulated variable, here the servo output voltage.

An alternative implementation of the proposed solution for AVP, combined with the reference voltage servo, includes a PID controller used to monitor the reference voltage of the switching converter. In this case it is possible to achieve the AVP function by injecting back on the feedback voltage a programmable proportion of the correction applied by the PID controller.

Figure 8A:
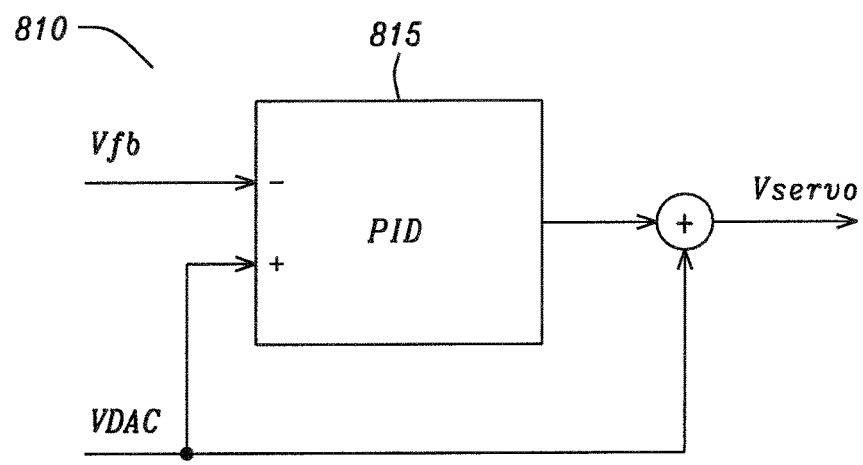
FIG. 8a is a block diagram illustrating a servo loop implemented with a Proportional Integral Loop (PID) and no AVP function.

FIG. 8a is a block diagram illustrating servo loop 810, equivalent to servo loop 211 in FIG. 2, and connected in the same way to the rest of the switching converter, implemented with a Proportional Integral Loop (PID) and no Adaptive Voltage Positioning (AVP) function. Feedback voltage VFB is connected to the inverting input of PID 815, and DAC reference voltage VDAC is connected to the non-inverting input of PID 815, and both are used to give a controlled offset to servo output voltage VSERVO. This is the case where the switching converter includes logic to compare the feedback voltage with the DAC reference voltage, achieving feedback capable of correcting the output voltage for high DC gain.

Figure 8B:
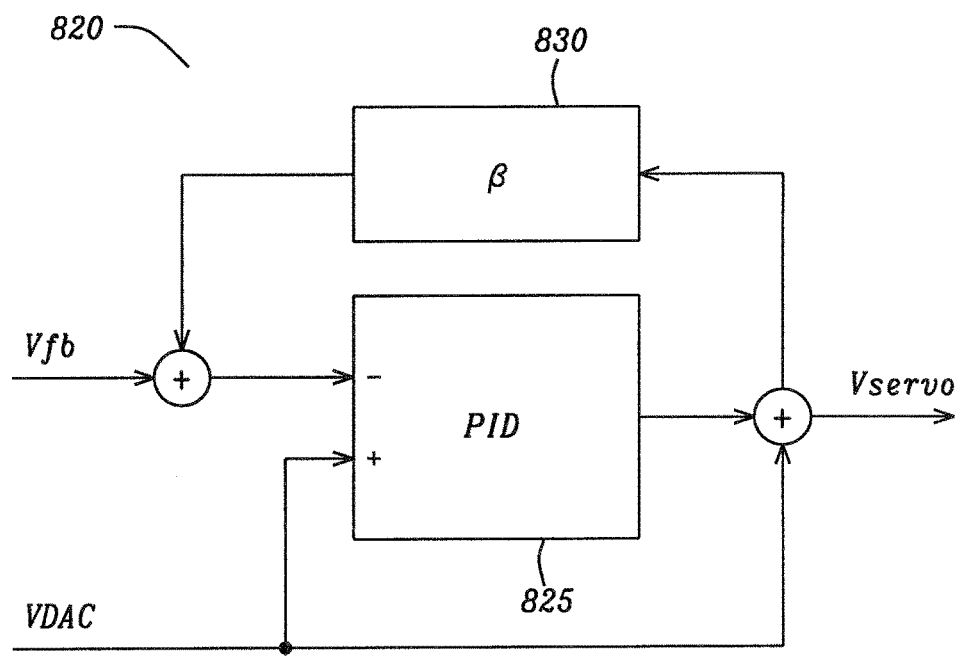
FIG. 8b is a block diagram illustrating a servo loop implemented with a Proportional Integral Loop (PID) and AVP function, to achieve a programmable load regulation, in an alternative implementation of the proposed solution.

FIG. 8b is a block diagram illustrating servo plus AVP 820, equivalent to servo plus AVP shown in FIGS. 4 and 5, and connected in the same way to the rest of the switching converter, implemented with a Proportional Integral Loop (PID) and AVP function, to achieve programmable load regulation, in an alternative implementation of the proposed solution. Feedback voltage VFB is connected to the inverting input of PID 825, and DAC reference voltage VDAC is connected to the non-inverting input of PID 825, and both are used to give a controlled offset to servo output voltage VSERVO. In addition to the controlled offset, factor β 830 may be made programmable, in order to vary the load regulation to the desired level given the specifics of the environment. The output voltage is modified, achieving a high DC gain, removing any offset at the output of the switching converter. The correction implemented by the PID controller is measured, and a programmable fraction of the correction is injected back onto the feedback voltage.

Figure 9:
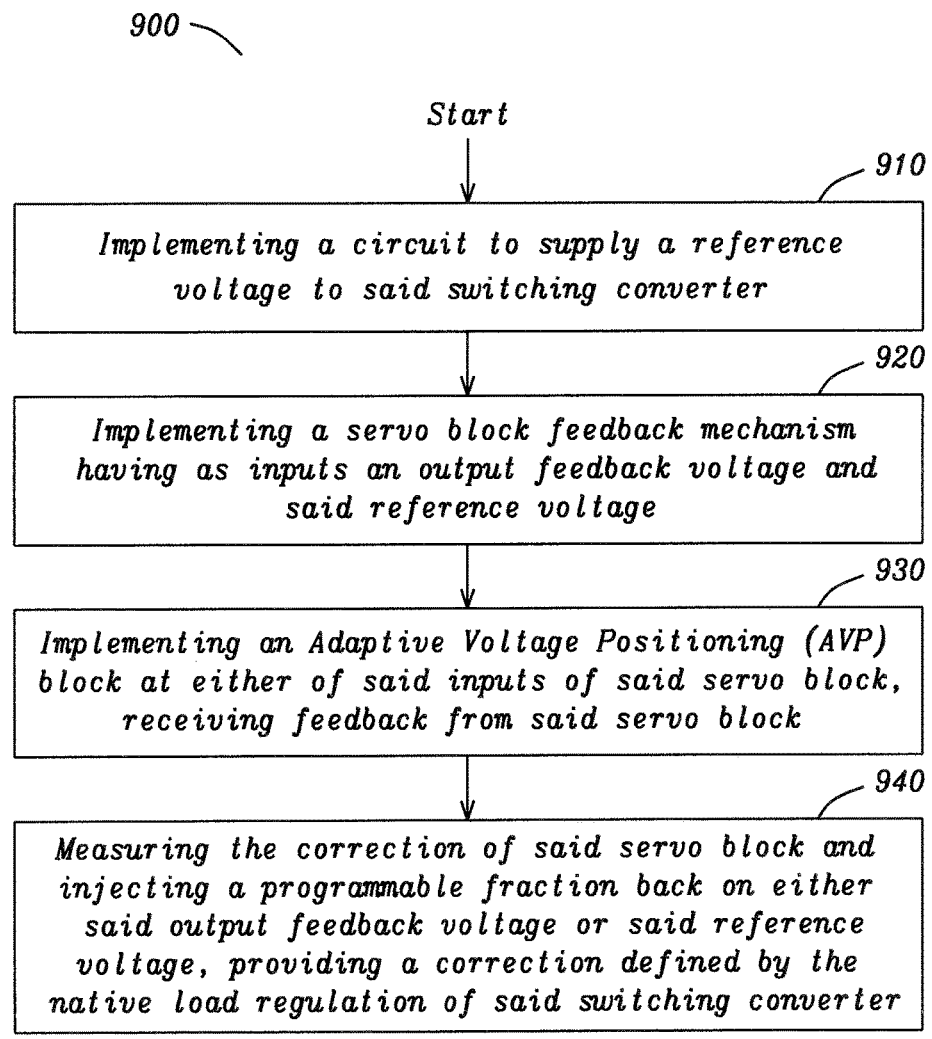
FIG. 9 is a flow chart of a method for Adaptive Voltage Positioning combined with a servo block feedback mechanism, embodying the principles of the disclosure.

FIG. 9 is a flow chart of a method for Adaptive Voltage Positioning combined with a servo block feedback mechanism 900, embodying the principles of the disclosure. Step 910 illustrates the implementation of a circuit to supply a reference voltage to a switching converter. Step 920 shows the implementation of a servo block feedback mechanism, having as inputs an output feedback voltage and a reference voltage. Step 930 illustrates the implementation of an Adaptive Voltage Positioning (AVP) block at either of the inputs of the servo block, receiving feedback from the servo block. Step 940 shows the measurement of the correction of the servo block and injecting a programmable fraction back on either the output feedback voltage or the reference voltage, providing a correction defined by the native load regulation of the switching converter.

The advantages of one or more embodiments of the present disclosure include that Adaptive Voltage Positioning (AVP) will be a requirement for future Power management integrated circuit (PMIC) generations. The proposed solution gives the opportunity of implementing the AVP function with negligible overhead in terms of circuit complexity, silicon area, and current consumption. The main advantages of the proposed solution are that the AVP function may be integrated with the current servo circuit block, and is modular in design. The AVP function allows easy programmability of the desired load regulation, and requires no changes to the main loop controls of the switching converter. The AVP function may be easily disabled, and a very short development time is required to have a functional solution.

While this disclosure has been particularly shown and described with reference to the preferred embodiments thereof, it will be understood by those skilled in the art that various changes in form and details may be made without departing from the spirit and scope of the disclosure.

The invention claimed is:

1. A switching converter, comprising:
a circuit to supply a reference voltage to said switching converter;
a servo block, having as inputs an output feedback voltage and said reference voltage;
an Adaptive Voltage Positioning (AVP) block,
wherein when said AVP block is configured on the output feedback voltage, and said servo block comprises a first transconductance (GM) stage, with a non-inverting input connected to said output feedback voltage across a programmable resistor, and an inverting input connected to said reference voltage, wherein said first GM stage has an output connected to a capacitor, and to a second GM stage, said second GM stage comprising a first transistor;
control loops connected to an output of said servo block, and said output feedback voltage;
switching logic outputs of said control loops; and
an output stage, driven by said switching logic, configured to supply the output feedback voltage of said switching converter.

2. The servo block of claim 1, wherein said capacitor is connected to a supply voltage and a first and second resistor, and said second GM stage has its source connected to said first resistor, gate connected to the output of said first GM stage, and drain connected to a third resistor.

3. The servo block of claim 1, wherein a second resistor is connected to the source of a second transistor, said second transistor's gate connected to the output of said first GM stage and drain connected to said non-inverting input of said first GM stage.

4. The servo block of claim 1, where a voltage across a third resistor is added to said reference voltage to give a controlled offset to said servo block output voltage.

* * * * *